No. 875,849. PATENTED JAN. 7, 1908.
G. R. RISHEL & E. H. WYKOFF.
BARK PEELER.
APPLICATION FILED MAR. 21, 1907.
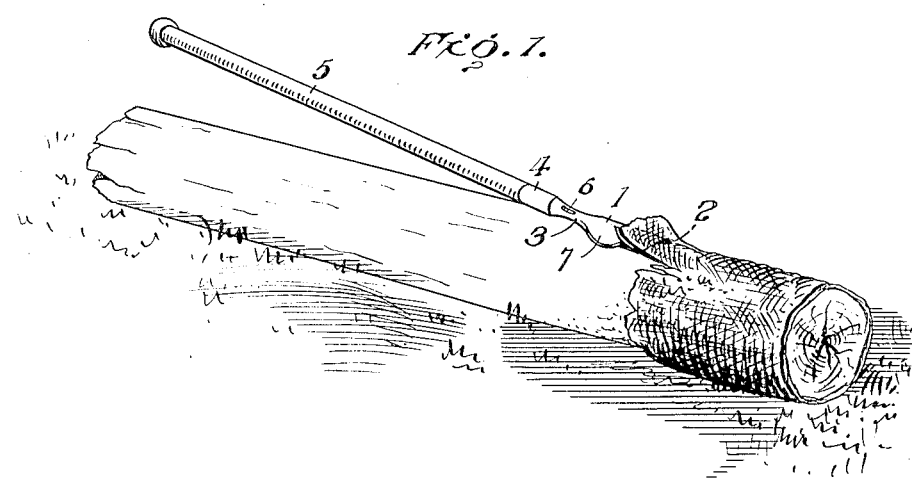
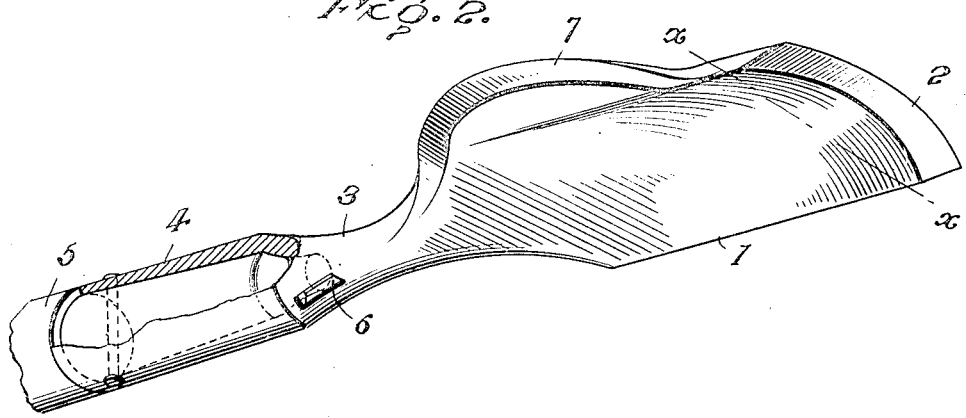
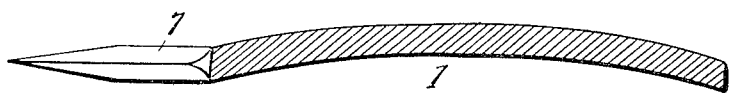
Witnesses
Inventors
G. R. Rishel,
E. H. Wykoff,
By
Attorneys

UNITED STATES PATENT OFFICE.

GEORGE R. RISHEL AND ELMO H. WYKOFF, OF ALEXANDRIA, PENNSYLVANIA.

BARK-PEELER.

No. 875,849.  Specification of Letters Patent.  Patented Jan. 7, 1908.

Application filed March 21, 1907. Serial No. 363,673.

*To all whom it may concern:*

Be it known that we, GEORGE R. RISHEL and ELMO H. WYKOFF, citizens of the United States, residing at Alexandria, in the county of Huntingdon and State of Pennsylvania, have invented certain new and useful Improvements in Bark-Peelers, of which the following is a specification.

This invention aims to provide a novel form of tool especially designed for stripping bark from trees and from such logs as are intended for manufacturing pulp for paper stock, the tool embodying a stripping blade and a chopping blade, the latter for removing knots met with in the peeling operation.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details, without departing from the spirit or essential features thereof, still the preferred embodiment is shown in the accompanying drawings, in which:

Figure 1 is a perspective view of a tool embodying the invention showing the manner of using the same. Fig. 2 is a perspective view of the tool as seen from a different point. Fig. 3 is a cross section of the blade on the line x—x of Fig. 2.

Corresponding and like parts are referred to in the following description and indicated in all the views of the drawings by the same reference characters.

The tool embodies an oblong blade 1 curved transversely between its longitudinal edges and having its front edge 2 sharpened and provided at its rear end with a shank 3 and socket 4, the latter receiving the end of a handle 5. A longitudinal slot 6 is formed in the inner end portion of the socket 4 to receive a drift or like tool to admit of removing the stub or broken end of a handle. The blade, shank and socket are of integral formation. The transverse curvature of the blade 1 may be such as best adapted for the particular work in hand and is usually formed on a circle having a ten or twelve inch diameter. A straight blade 7 is provided at one edge of the blade 1 and terminates some distance from the cutting edge 2. The blade 7 is straight and its outer edge is curved, said blade being utilized to remove knots obstructing the advance of the blade 1 when stripping the bark from a log. The blade 7 is used in substantially the same manner as a hatchet or ax, the tool being wielded by gripping the handle 5 in substantially the same manner as an ax or hatchet.

To strip the bark from a tree after the latter has been felled, the edge 2 is inserted between the trunk of the tree and the bark, and the handle 5 is grasped and the tool pressed forward. When a knot is encountered, the tool is withdrawn and the same wielded to bring the blade 7 into play for removing the knot after which the tool is returned to the position occupied when the knot was met with, and the stripping of the bark continued by pressing forward upon the handle 5.

Having thus described the invention, what is claimed as new is:

1. A tool for removing bark from trees, the same comprising a transversely curved stripping blade having its front edge sharpened, and a flat chopping blade at the longitudinal edge of the stripping blade.

2. A tool for removing bark from trees, comprising an oblong stripping blade transversely curved and having its longitudinal elements straight and its front edge sharpened, and a flat chopping blade at the longitudinal edge of the stripping blade and set back some distance from the cutting edge thereof.

In testimony whereof we affix our signatures in presence of two witnesses.

GEORGE R. RISHEL. [L. S.]
ELMO H. WYKOFF. [L. S.]

Witnesses:
S. ROSS BLACK,
LETTY J. STEEL.